(12) United States Patent
Kwak et al.

(10) Patent No.: US 12,302,296 B2
(45) Date of Patent: May 13, 2025

(54) UE OPERATION METHOD RELATED TO DETERMINING NUMBER OF SLOTS IN WIRELESS COMMUNICATION SYSTEM

(71) Applicant: LG ELECTRONICS INC., Seoul (KR)

(72) Inventors: Minsung Kwak, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 407 days.

(21) Appl. No.: 17/921,590

(22) PCT Filed: Apr. 27, 2021

(86) PCT No.: PCT/KR2021/005318
§ 371 (c)(1),
(2) Date: Oct. 26, 2022

(87) PCT Pub. No.: WO2021/221441
PCT Pub. Date: Nov. 4, 2021

(65) Prior Publication Data
US 2023/0180197 A1 Jun. 8, 2023

Related U.S. Application Data

(60) Provisional application No. 63/039,946, filed on Jun. 16, 2020.

(30) Foreign Application Priority Data

Apr. 27, 2020 (KR) .................. 10-2020-0050747

(51) Int. Cl.
*H04W 72/0446* (2023.01)
*H04W 28/02* (2009.01)
*H04W 72/40* (2023.01)

(52) U.S. Cl.
CPC ... *H04W 72/0446* (2013.01); *H04W 28/0284* (2013.01); *H04W 72/40* (2023.01)

(58) Field of Classification Search
CPC .................................. H04W 72/0446
See application file for complete search history.

(56) References Cited

U.S. PATENT DOCUMENTS

2020/0044971 A1     2/2020  Gulati et al.
2020/0413440 A1*   12/2020  Marcone .................. H04L 5/22
2022/0287083 A1*    9/2022  Gomes Baltar ....... H04W 16/14

FOREIGN PATENT DOCUMENTS

WO       2018199728 A1    11/2018

OTHER PUBLICATIONS

OPPO, "Left issues on inter-RAT UAI configuration and CBR report [N038]", Change Request, 3GPP TSG-RAN2 Meeting # 109bis electronic, Apr. 20-30, 2020, R2-2002628.

(Continued)

*Primary Examiner* — Kouroush Mohebbi
(74) *Attorney, Agent, or Firm* — BRYAN CAVE LEIGHTON PAISNER LLP

(57) ABSTRACT

One embodiment is a UE operation method related to a sidelink in a wireless communication system, the method comprising: a UE calculating first congestion information associated with an LTE terminal in a predetermined interval; the UE calculating second congestion information associated with an ITS terminal in the predetermined interval; and the UE determining slots for LTE on the basis of the first congestion information and the second congestion information, wherein the first congestion information is the ratio of the number of PSCCH candidate positions of which RSRP is equal to or greater than a first threshold value, to the total number of subchannels in the predetermined interval.

12 Claims, 21 Drawing Sheets

(56) References Cited

OTHER PUBLICATIONS

Ericsson, "[E046, E047] Correction to CBR measurements for V2X", 3GPP TSG-RAN WG2 Meeting #109bis-e, Apr. 20-30, 2020, R2-2003213.
5GAA WG4, "Reply to LS on NR V2X sidelink operation", 3GPP TSG RAN WG4 Meeting #92-Bis, Oct. 14-18, 2019, R4-1910721.

* cited by examiner (a)

(b)

(a)

(b)

UE OPERATION METHOD RELATED TO DETERMINING NUMBER OF SLOTS IN WIRELESS COMMUNICATION SYSTEM

This application is the National Stage filing under 35 U.S.C. 371 of International Application No. PCT/KR2021/005318, filed on Apr. 27, 2021, which claims the benefit of and priority to Korean Application No. 10-2020-0050747, filed on Apr. 27, 2020 and U.S. Provisional Application No. 63/039,946, filed on Jun. 16, 2020, the contents of which are all hereby incorporated by reference herein in their entirety.

TECHNICAL FIELD

The following description related to a wireless communication system, and more particularly, to a method of determining a slot to be used in each radio access technology (RAT) in a situation in which LTE and ITS-G5 UEs coexist.

BACKGROUND

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

SUMMARY

Embodiment(s) relates to a method of determining the number and location of slots to be used each radio access technology (RAT) in a situation in which LTE and ITS-G5 UEs coexist.

According to an embodiment, an operation method of a user equipment (UE) related to a sidelink relay in a wireless communication system includes calculating first congestion level information related to an LTE UE in a predetermined section, by the UE, calculating second congestion level information related to an ITS UE in the predetermined section, by the UE, and determining a slot for LTE based on the first congestion level information and the second congestion level information, by the UE, wherein the first congestion level information is a ratio of a number of PSCCH candidate locations having an RSRP equal to or greater than a first threshold to a total number of subchannels in the predetermined section.

According to an embodiment, a use equipment (UE) in a wireless communication system includes at least one processor, and at least one computer memory operatively connected to the at least one processor and configured to store instructions for causing the at least one processor to perform operations when executed, wherein the operations include calculating first congestion level information related to an LTE UE in a predetermined section, calculating second congestion level information related to an ITS UE in the predetermined section, and determining a slot for LTE based on the first congestion level information and the second congestion level information, wherein the first congestion level information is a ratio of a number of PSCCH candidate locations having an RSRP equal to or greater than a first threshold to a total number of subchannels in the predetermined section.

According to an embodiment, a processor for performing operations for a user equipment (UE) in a wireless communication system includes calculating first congestion level information related to an LTE UE in a predetermined section, calculating second congestion level information related to an ITS UE in the predetermined section, and determining a slot for LTE based on the first congestion level information and the second congestion level information, wherein the first congestion level information is a ratio of a number of PSCCH candidate locations having an RSRP equal to or greater than a first threshold to a total number of subchannels in the predetermined section.

An embodiment provides a non-volatile computer-readable storage medium for storing at least one computer program including an instruction for causing at least one processor to perform operations for a user equipment (UE) when being executed by the at least one processor, the operations including calculating first congestion level information related to an LTE UE in a predetermined section, calculating second congestion level information related to an ITS UE in the predetermined section, and determining a slot for LTE based on the first congestion level information and the second congestion level information, wherein the first congestion level information is a ratio of a number of PSCCH candidate locations having an RSRP equal to or greater than a first threshold to a total number of subchannels in the predetermined section.

The second congestion level information may be a ratio of a number of preambles having power equal to or greater than a second threshold to a total number of preambles in the predetermined section.

The first congestion level may be determined using $$HighRxPowerRatio_{LTE} = \frac{N_{PSCCH_{RSRP \geq Threshold}}}{numSubchannel * numSubframes},$$

the numSubchannel*numSubframes being a total number of subchannels in the predetermined section, the $N_{PSCCH_{RSRP \geq Threshold}}$ being a number of PSCCH candidate locations having an RSRP equal to or greater than a first threshold, and $HighRxPowerRatio_{LTE}$ being the first congestion level information.

The second congestion level may be determined using $$HighRxPowerRatio_{ITSG5} = \frac{N_{Preamble_{SignalStrength \geq Threshold}}}{TotalNumPreamble},$$

the TotalNumPreamble being a total number of preambles in the predetermined section, the $N_{Preamble_{SignalStrength \geq Threshold}}$ being a number of preambles having power equal to or greater than a second threshold, and $HighRxPowerRatio_{ITSG5}$ being the second congestion level information.

A number of the slots for the LTE may be determined according to where a value $$Tech_{percentage} = \frac{HighRxPowerRatio_{LTE}}{HighRxPowerRatio_{LTE} + HighRxPowerRatio_{ITSG5}}$$

included in a preconfigured first section set.

The number of the slots for the LTE and a number of the slots for the ITS may be configured in each section of the first section set.

A location of a slot according to the number of the slots for the LTE and a location of a slot according to a number of the slots for the ITS may be preconfigured.

The number of the slots for the LTE may be determined irrespective of the second congestion level.

The number of the slots for the LTE may be determined according to whether the first congestion level is included in a preconfigured second section set and a location of a slot start from slot #1.

A number of the slots for the ITS may be determined according to whether the second congestion level is included in a preconfigured third section set and a location of a slot start from slot #10.

An embodiment may solve a problem in which a small number of UEs using LTE V2X technology are measured because PSCCH decoding fails due to congestion even if a sidelink UE uses a lot of resources and a congestion level is high.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
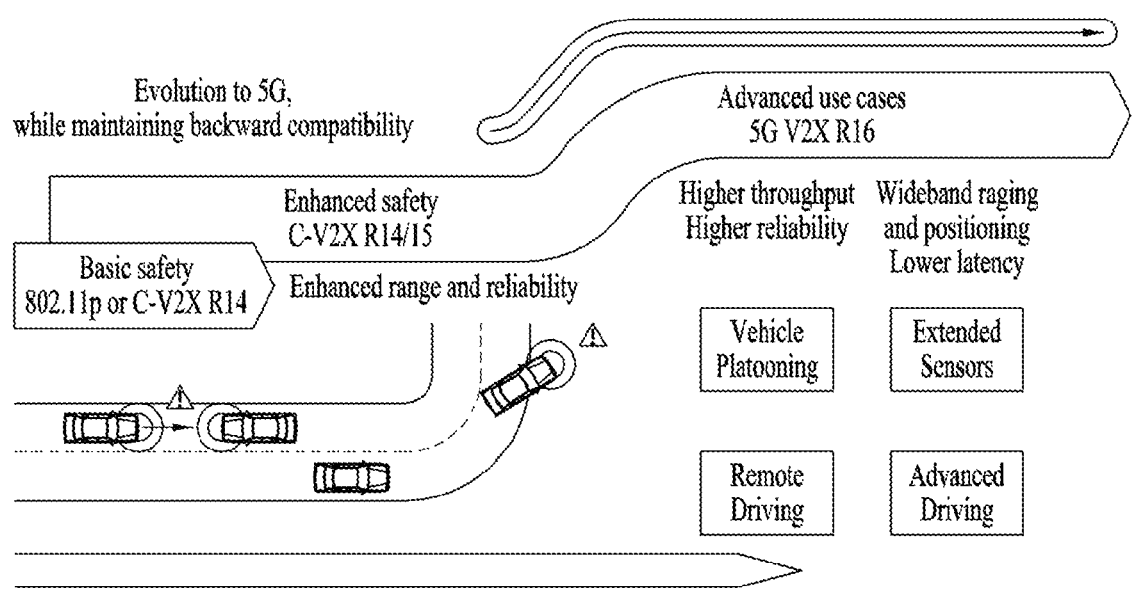
FIG. 1 is a diagram comparing vehicle-to-everything (V2X) communication based on pre-new radio access technology (pre-NR) with V2X communication based on NR.
Figure 2:
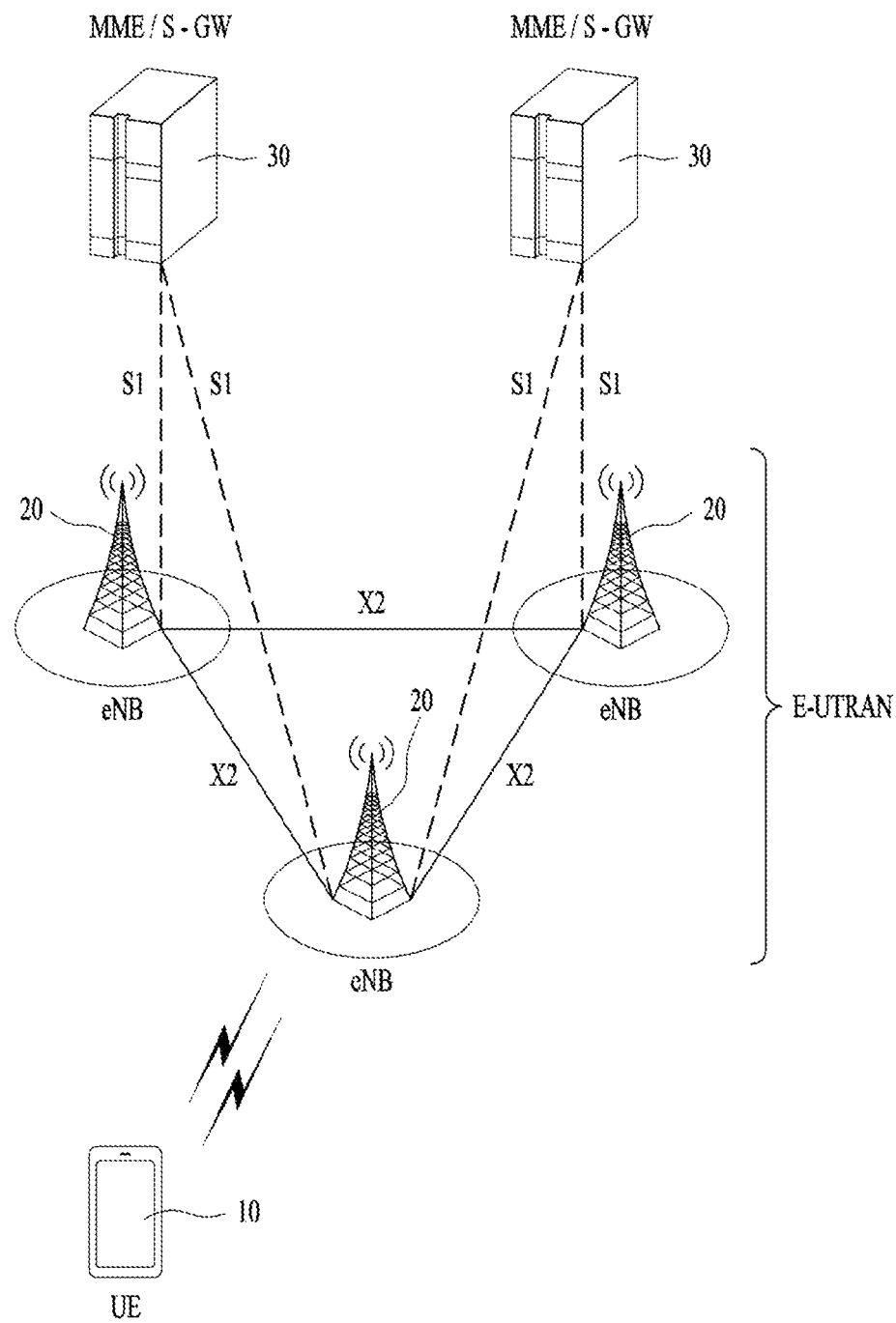
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
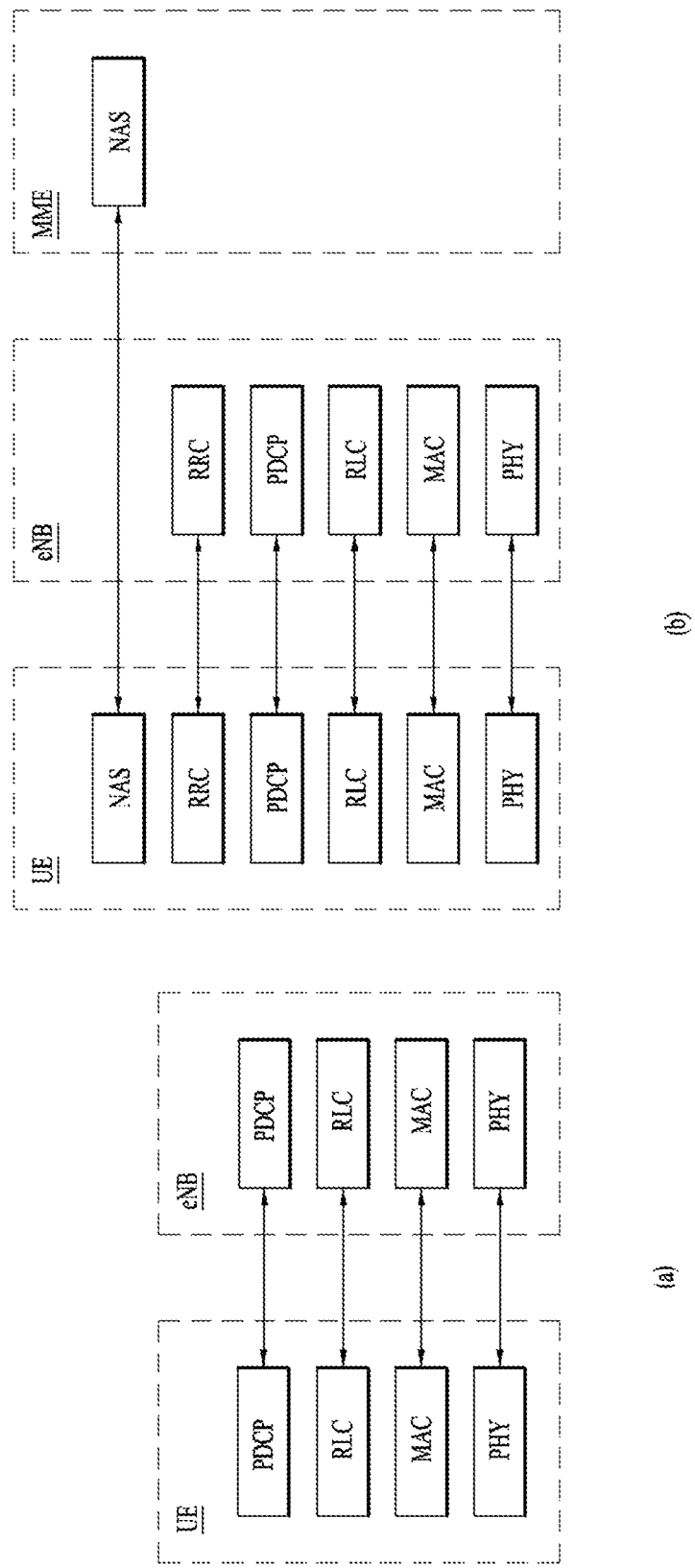
FIG. 3 is a diagram illustrating user-plane and control-plane radio protocol architectures according to an embodiment of the present disclosure.

FIG. 3(a) illustrates a user-plane radio protocol architecture according to an embodiment of the disclosure.

FIG. 3(b) illustrates a control-plane radio protocol architecture according to an embodiment of the disclosure. A user plane is a protocol stack for user data transmission, and a control plane is a protocol stack for control signal transmission.

Referring to FIGS. 3(a) and 3(b), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
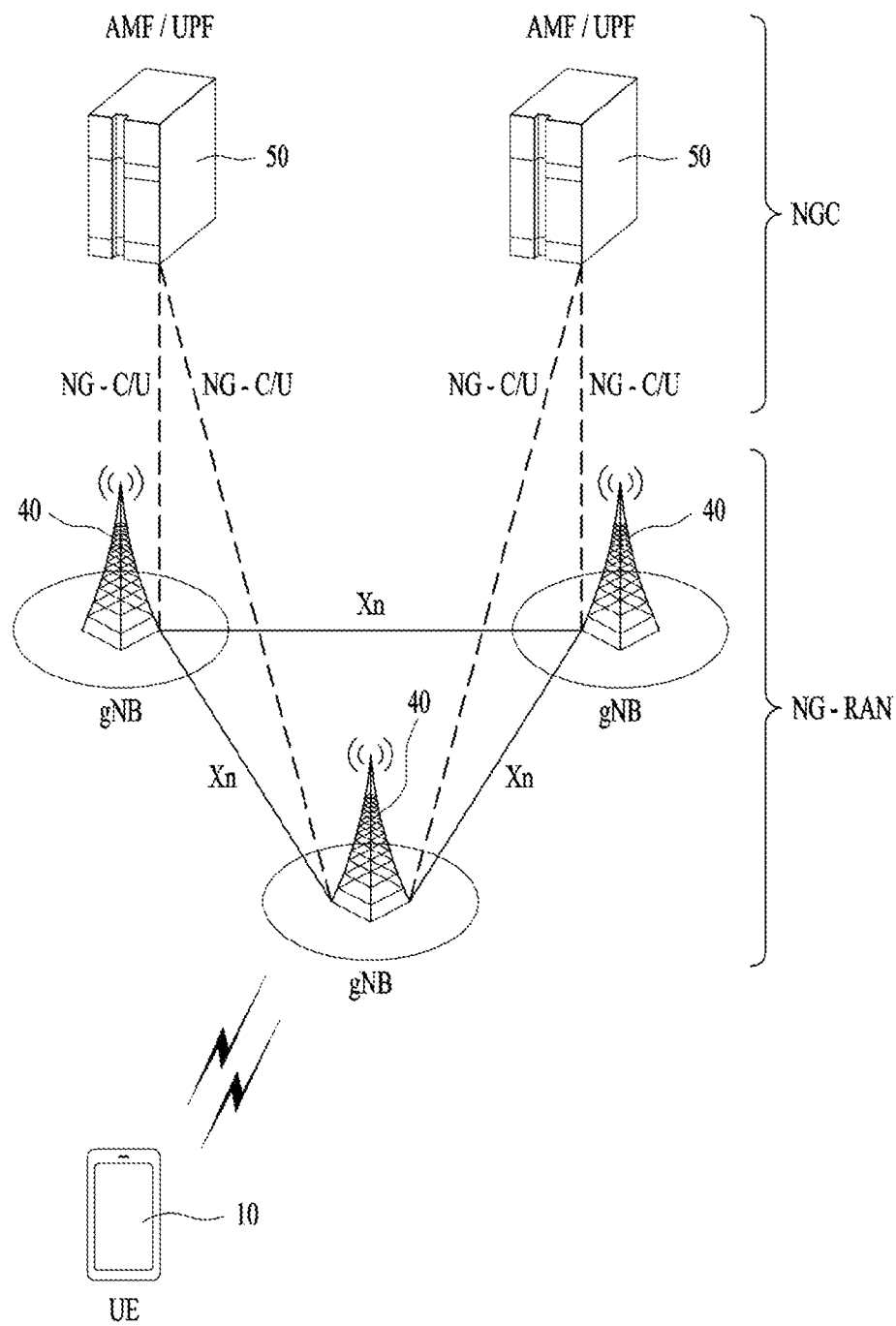
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
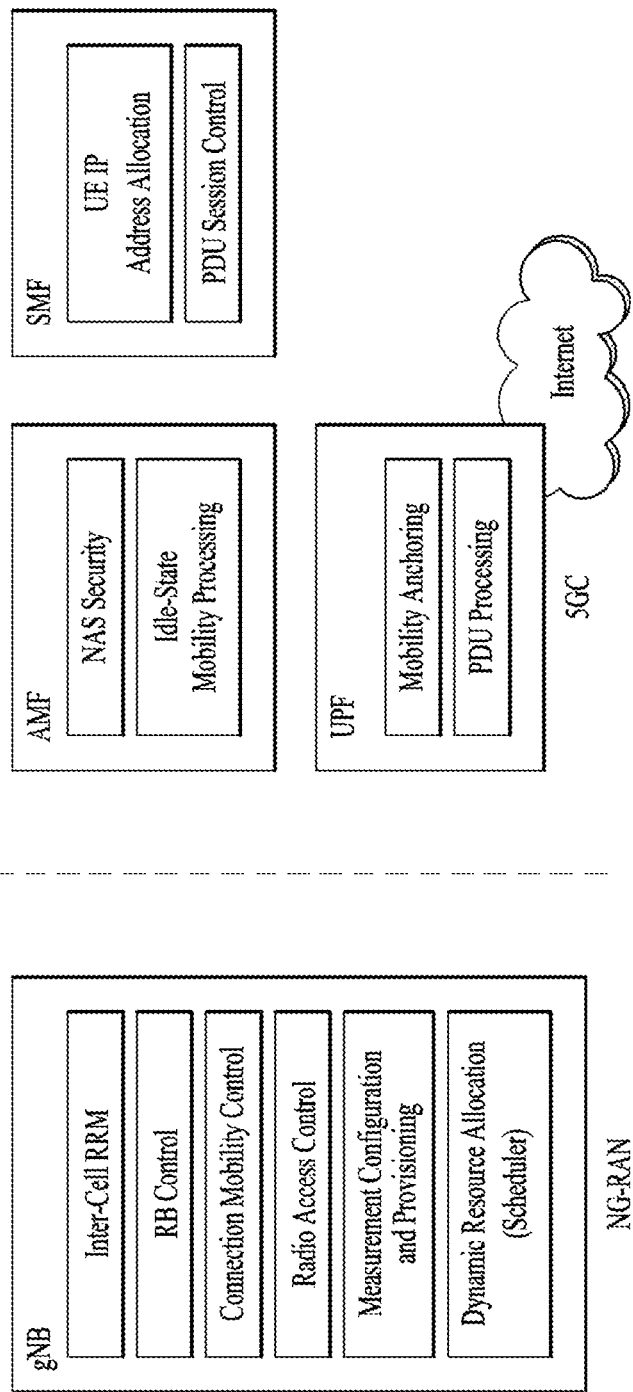
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
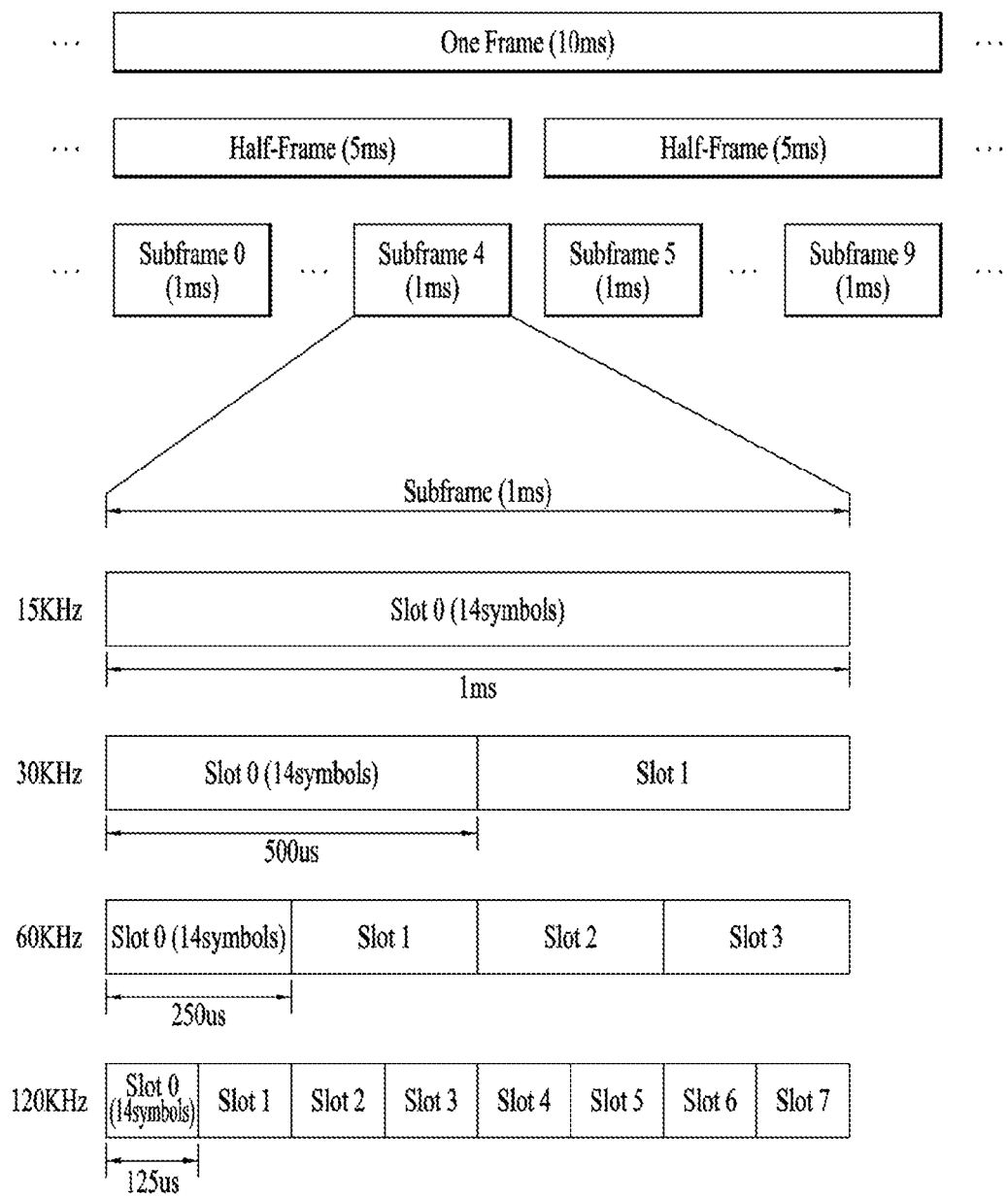
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration μ in the NCP case.

TABLE 1

| SCS (15*2^u) | $N^{slot}_{symb}$ | $N^{frame,\mu}_{slot}$ | $N^{subframe,\mu}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,\mu}_{slot}$ | $N^{subframe,\mu}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
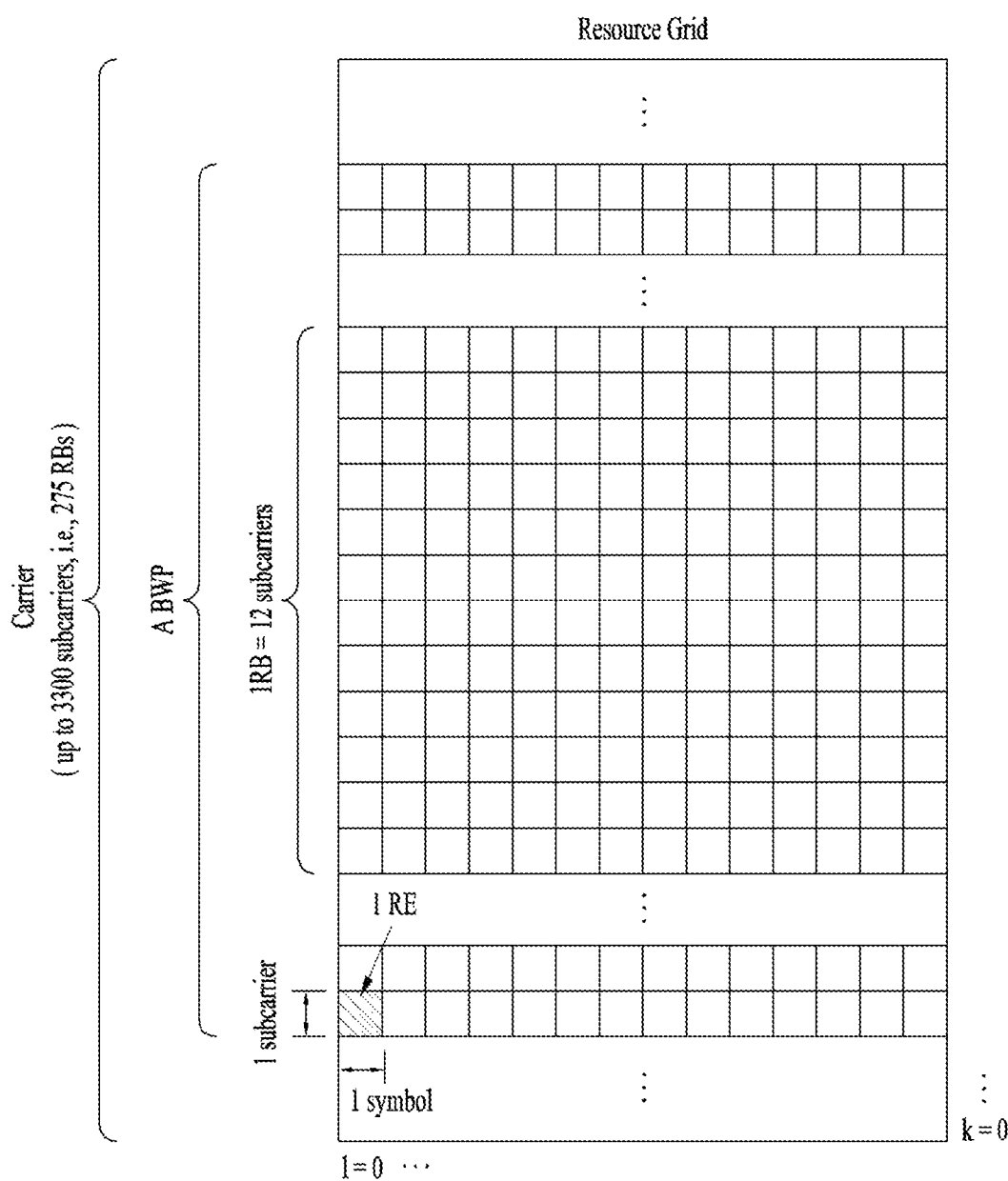
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3.

In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
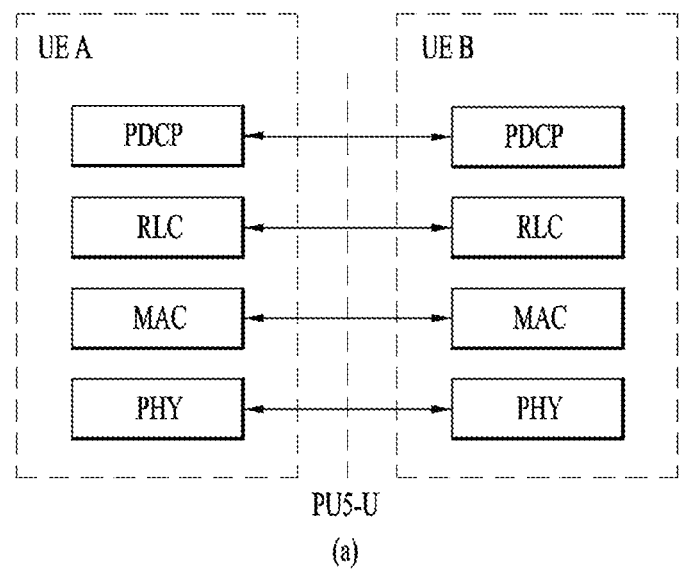
FIG. 8 is a diagram illustrating radio protocol architectures for sidelink (SL) communication according to an embodiment of the present disclosure.
Figure 8:
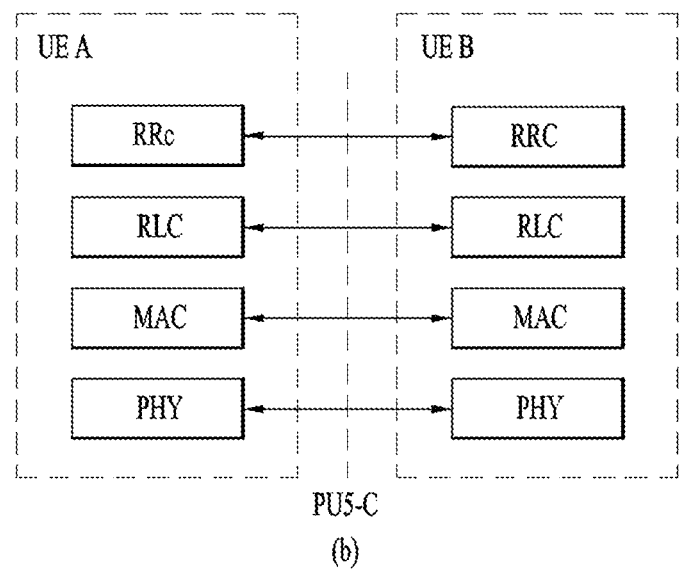

FIG. 8 illustrates a radio protocol architecture for SL communication according to an embodiment of the present disclosure. Specifically, FIG. 8(a) illustrates a user-plane protocol stack in LTE, and FIG. 8(b) illustrates a control-plane protocol stack in LTE.

Figure 9:
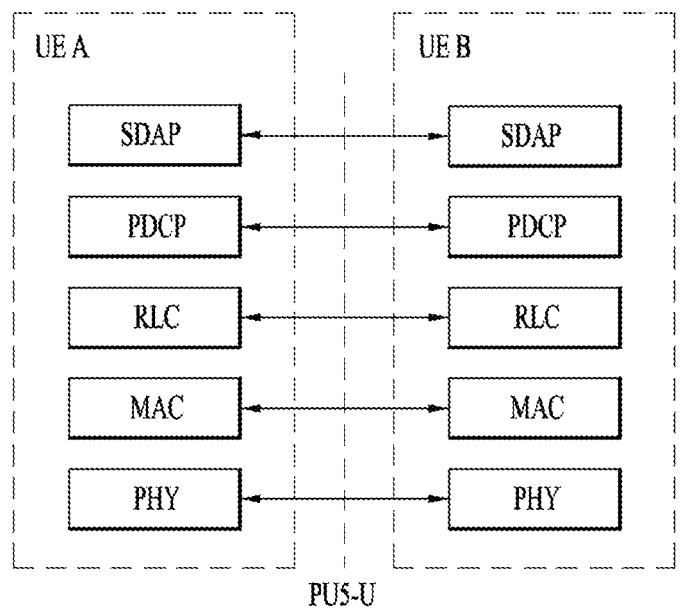
FIG. 9 is a diagram illustrating radio protocol architectures for SL communication according to an embodiment of the present disclosure.
Figure 9:
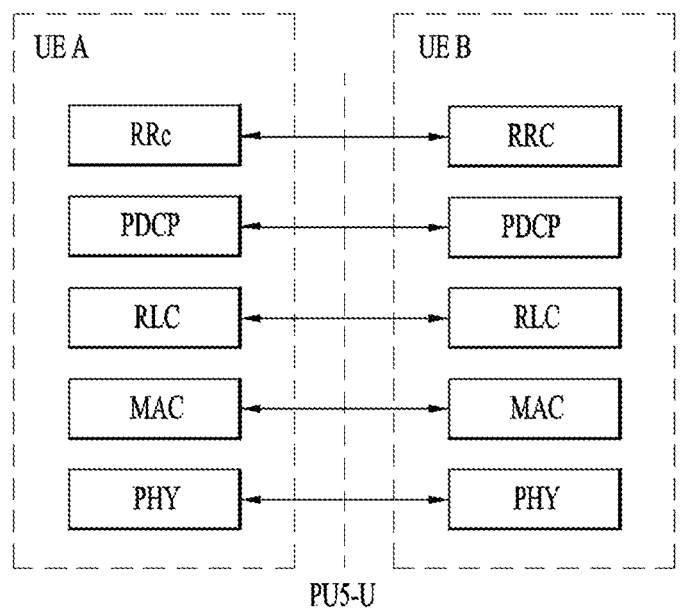

FIG. 9 illustrates a radio protocol architecture for SL communication according to an embodiment of the present disclosure. Specifically, FIG. 9(a) illustrates a user-plane protocol stack in NR, and FIG. 9(b) illustrates a control-plane protocol stack in NR.

Resource allocation in SL will be described below.

Figure 10:
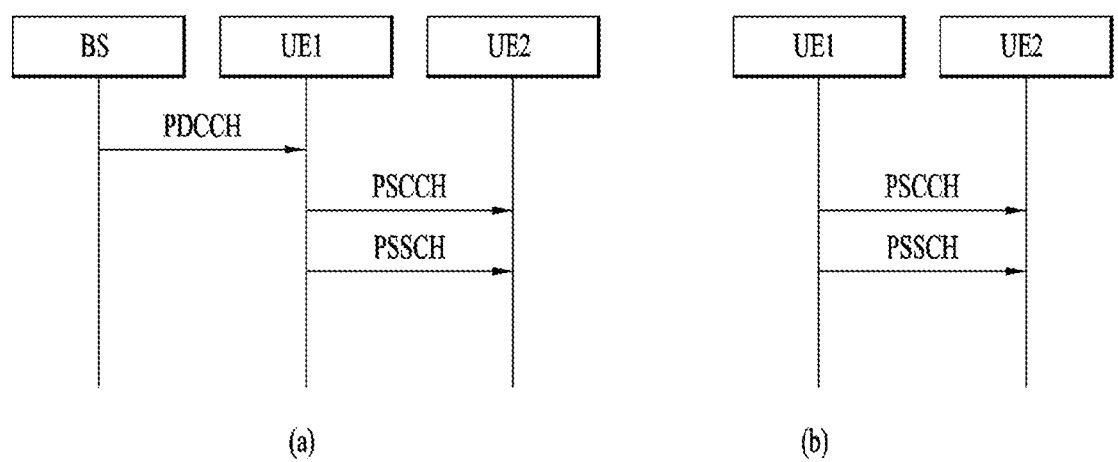
FIG. 10 illustrates a procedure in which a UE performs V2X or SL communication according to a transmission mode according to an embodiment of the present disclosure.

FIG. 10 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 10(a) illustrates a UE operation related to LTE transmission mode 1 or LTE transmission mode 3. Alternatively, for example, FIG. 10(a) illustrates a UE operation related to NR resource allocation mode 1. For example, LTE transmission mode 1 may be applied to general SL communication, and LTE transmission mode 3 may be applied to V2X communication.

For example, FIG. 10(b) illustrates a UE operation related to LTE transmission mode 2 or LTE transmission mode 4. Alternatively, for example, FIG. 10(b) illustrates a UE operation related to NR resource allocation mode 2.

Referring to FIG. 10(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 10(b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or an SL CSI-RS transmission indicator or information about the number of SL CSI-RS antenna ports (to be transmitted);

location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

In a situation in which LTE (technology) and Intelligent transportation system (ITS) (technology) coexist, a slot boundary may be determined based on a CBR. Metric $Tech_{percentage}$ that is a technology ratio is introduced to indicate an actual ratio of a user belonging to LTE-V2X and a user belonging to ITS-G5 technology, respectively, in a given geographic environment at a given time. In this proposal, $Tech_{percentage}$ is calculated by LTE-V2X stations (only). Refer to Equation 1 below.

$$Tech_{percentage} = \frac{CBR_{LTE}}{CBR_{LTE+ITSG5}}. \qquad \text{[Equation 1]}$$

The goal is essentially to distinguish between a message related to a technology of an LTE-V2X station on a given frequency channel and a message related to ITS-G5. This function may be referred to as self-detection. Self-detection metric $CBR_{LTE}$ is defined by Equation 2 below.

$$CBR_{LTE} = \frac{N_{PSCCH_{CRCPASS}}}{numSubchannel * numSubframes_{Tech_{percentage}}} \qquad \text{[Equation 2]}$$

Here, $N_{PSCCH_{CRCPASS}}$ is the number of LTE-V2X PSCCHs successfully decoded (CRC-passed) during the last $numSubframes_{Tech_{percentage}}$ in a channel of 10 MHz, and a retransmission flag is 0 (i.e., initial transmission). A PSCCH associated with HARQ retransmission is not considered because these packets are counted twice (ITS-G5 does not repeat). numSubchannel is the number of subchannels defined in Table B.2 of TS 103 613, that is, 5 subchannels, and $numSubframes_{Tech_{percentage}}$ is the total measurement time configured to 100 ms.

Two options $CBR_{LTE+ITSG5}$ (started from LTE-V2X and ITS-G5 stations) for measuring aggregated traffic on a channel are summarized in Table 5 below.

TABLE 5

| Option | Description |
|---|---|
| #1 | $CBR_{LTE+ITSG5}$ is exactly the CBR as defined by LTE-V2X.<br>NOTE: This option is an attempt to minimize deviation from LTE-V2X release 14 standard. It relies upon the existing LTE-V2X CBR measurement to capture the overall traffic in the channel. The LTE-V2X CBR is defined in specification 36.213, and is used in the resource selection procedure (ETSI 136.213) and the CRlimit computation (ETSI EN 302 574). |

TABLE 5-continued

| Option | Description |
|---|---|
| #2 | $CBR_{LTE+ITSG5}$ is defined as $CBR_{LTS} + CBR_{ITSG5}$, where $CBR_{ITSG5}$ measures the occupancy of the channel originating from ITS-G5 specifically. In order to perform this measurement, LTE-V2X stations are required to recognize the ITS-G5 preamble, typically by correlations looking for the L-STF golden sequence. |

A concept of a state of $Tech_{percentage}$ is introduced. Here, each technique may access multiple timeslots in repeated N timeslot patterns based on an actual footprint of a channel with a default configuration of N=10, and one timeslot equals one LTE subframe (1 ms). Table 6 shows possible state configurations.

TABLE 6

| | $Tech_{percentage} = \dfrac{CBR_{LTE}}{CBR_{LTE+ITSG5}}$ | Number of timeslots granted to LTE-V2X | Number of timeslots granted to ITS-G5 |
|---|---|---|---|
| state 0 (implicit) | 0% exactly (no LTE-V2X users) | 0 | 10 |
| state 1 | <15% | 1 | 3 |
| state 2 | [15-25]% | 2 | 8 |
| state 3 | [25-35]% | 3 | 7 |
| state 4 | [35-45]% | 4 | 6 |
| state 5 | [45-55]% | 5 | 5 |
| state 6 | [55-65]% | 6 | 4 |
| state 7 | [65-75]% | 7 | 3 |
| state 8 | [75-85]% | 8 | 2 |
| state 9 | >85% | 9 | 1 |

In this method, reservation may be performed by the LTE-V2X station. That is, the repeating pattern of 10 ms and 10 states is recognized only in the LTE-V2X station. The ITS-G5 station recognizes a channel reserved and available for 1 ms through a message header of the LTE-V2X station.

The "state 0" is an implicit state. There is no exact LTE-V2X message issued by the ITS station. The basis of the "state 0" is that the ITS-G5 is capable of using all timeslots when there is no LTE-V2X reservation. In terms of the ITS-G5 station, in the "state 0", a timeslot is not allocated to the LTE-V2X station. There is no "state 0" in terms of the LTE-V2X station. When the LTE-V2X station starts operating in an area, the least amount of traffic may always be used, and thus a scheme automatically switches to the "state 1".

In terms of the LTE-V2X station, this control mechanism limits a subframe pool for LTE-V2X transmission. This mechanism is already supported by the LTE-V2X resource reservation scheme, which is mainly designed to handle a situation in which the LTE uplink shares a channel with the LTE sidelink and a pool of sidelink subframes is not necessarily all subframes. The only difference in the method presented here is that each station calculates the $Tech_{percentage}$ metric and automatically derives a subframe pool allowed for sidelink.

Only the LTE-V2X station knows the super frame schedule, and ITS-G5 sometimes recognizes that a channel is busy.

When a slot boundary is dynamically changed according to a $Tech_{percentage}$ value calculated based on the CBR described in the prior art, if PSCCH reception fails due to a large number of LTE V2X devices causing a lot of interference, PSCCH decoding may fail. In this case, when $CBR_{LTE}$ used for calculation of $Tech_{percentage}$ is determined as the number of CRC pass by successfully decoding the PSCCH, (because of PSCCH reception failure due to congestion,) there may be a problem in that a share of UEs using the LTE V2X technologies may be measured low.

Accordingly, an embodiment of the present disclosure proposes a method of dynamically changing a slot boundary based on power measured in each transmission technology via determination as to whether a UE actually uses a message belonging to the LTE-V2X or a message belonging to ITS-G5 in a given frequency channel.

Figure 11:
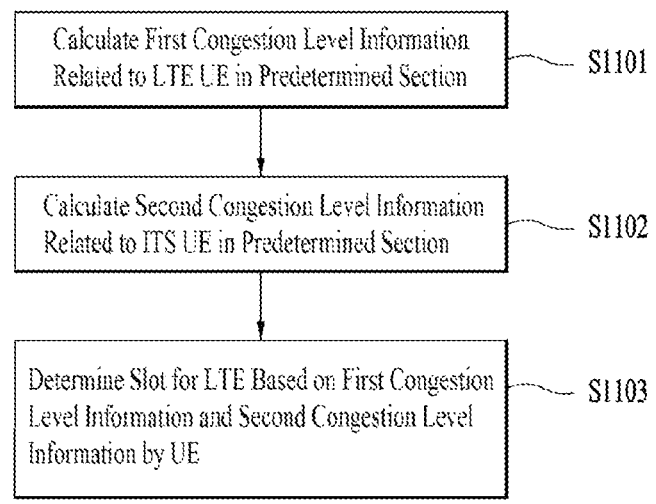
FIGS. 11 to 14 are diagrams for explaining embodiment(s)

A UE according to an embodiment may calculate first congestion level information related to an LTE UE in a predetermined section (S1101 in FIG. 11), the UE may calculate second congestion information related to an ITS UE in the predetermined section (FIG. S1102 of 11), and based on the first congestion level information and the second congestion level information, the UE may determine a slot for LTE (S1103 of FIG. 11). Then, the UE may transmit a sidelink signal in the slot for LTE.

Here, the first congestion level information may be a ratio of the number of PSCCH candidate locations in which an RSRP is equal to or greater than a first threshold to the total number of subchannels within the predetermined section. In detail, for example, the first congestion level is calculated using Equation 3 below.

$$HighRxPowerRatio_{LTE} = \frac{N_{PSCCH_{RSRP \geq Threshold}}}{numSubchannel * numSubframes}, \quad [\text{Equation 3}]$$

The numSubchannel*numSubframes is the total number of subchannels in the predetermined section, the $N_{PSCCH_{SRP \geq Threshold}}$ is the number of PSCCH candidate locations having an RSRP equal to or greater than the first threshold, and $HighRxPowerRatio_{LTE}$ is the first congestion level information.

That is, the LTE-V2X UE may calculate $HighRxPowerRatio_{LTE}$ by calculating a ratio of the number of PSCCH candidate locations in which electric power of a reference signal (RSRP) of a PSCCH is equal to or greater than a threshold among all PSCCH candidate locations transmitted in the entire subchannel*subframe, an example of which is shown in Equation 3 above.

In this method, regardless of whether PSCCH decoding is successful or not, if there is a UE using the corresponding candidate location, information about a congestion level may be obtained based on an increase in an RSRP of the PSCCH, thereby solving the aforementioned problem of the existing operation (e.g., a problem in which a small number of UEs using LTE V2X technology are measured because PSCCH decoding fails due to congestion even if a sidelink UE uses a lot of resources and a congestion level is high).

Subsequently, the second congestion level information may be a ratio of the number of preambles having power equal to or greater than a second threshold to the total number of preambles in the predetermined section. For example, the second congestion level is calculated using Equation 4 below.

$$HighRxPowerRatio_{ITSG5} = \frac{N_{Preamble_{SignalStrength \geq Threshold}}}{TotalNumPreamble} \quad \text{[Equation 4]}$$

The TotalNumPreamble is the total number of preambles in the predetermined section, the $N_{Preamble_{SignalStrength \geq Threshold}}$ is the number of preambles having power equal to or greater than the second threshold, and HighRxPwerRatio$_{ITSG5}$ is the second congestion level information.

That is, the ITS-G5 UE may use the number of preambles having power equal to or greater than a predetermined level. That is, the ITS-G5 UE may calculate HighRxPowerRatio$_{ITSG5}$ by calculating a ratio of the number of preambles having power measured to be equal to or greater than a threshold to the total number of preambles used for power measurement in a PPDU frame transmitted in a slot boundary.

As described above, after calculating/acquiring/deriving/estimating the first congestion level information and the second congestion level information, the UE may determine the number and location of slots to be used in each system. That is, the number and location of the slots to be used in each system may be determined with respect to measured values of two systems based on HighRxPowerRatio$_{LTE}$ and HighRxPowerRatio$_{ITSG5}$ values calculated in each system.

The number and location of slots may be determined using both the first congestion level and the second congestion level or may also be independently/separately determined from each of the first congestion level and the second congestion level.

First, the number and location of slots may be determined according to a relative comparison of HighRxPowerRatio values measured in each system. A slot boundary of a given frequency channel may be dynamically changed according to the relative comparison of the HighRxPowerRatio values calculated in each system.

In detail, the number of the slots for LTE may be determined according where a value $$Tech_{percentage} = \frac{HighRxPowerRatio_{LTE}}{HighRxPowerRatio_{LTE} + HighRxPowerRatio_{ITSG5}}$$

is included in a preconfigured first section set.

The number of slots for the LTE and the number of slots for the ITS may be configured in each section of the first section set. That is, the first section set may be shown in Table 7 below. However, Table 7 is only an example, and the number of states and the number of slots allocated to each system according to Tech$_{percentage}$ may also be changed.

TABLE 7

| | Tech$_{percentage}$ | Number of timeslots granted to LTE-V2X | Number of timeslots granted to ITS-G5 |
|---|---|---|---|
| state 0 (implicit) | 0% exactly (no LTE-V2X users) | 0 | 10 |
| state 1 | <15% | 1 | 9 |
| state 2 | [15-25[% | 2 | 8 |
| state 3 | [25-35[% | 3 | 7 |
| state 4 | [35-45[% | 4 | 6 |
| state 5 | [45-55[% | 5 | 5 |
| state 6 | [55-65[% | 6 | 4 |
| state 7 | [65-75[% | 7 | 3 |
| state 8 | [75-85]% | 8 | 2 |
| state 9 | >85% | 9 | 1 |

When the number of slots to be used by each system is determined, a set of slots to be used by each system may be automatically determined, preventing different UEs belonging to the same system from operating in different slots and minimizing a measurement difference between slot sets operating even when an error occurs in a measurement between UEs. Among the slot for the LTE system and the slot for the ITS-G5 system, which system is preferentially allocated may be predetermined or preconfigured by a BS. For example, when the current state is state 6 and the LTE system is configured or determined to be prioritized, 6 slots for the ITS-G5 system may be arranged after 4 slots for the LTE system are prioritized. That is, the location of the slot according to the number of slots for the LTE and the location of the slot according to the number of slots for the ITS may be preconfigured.

Second, the number and location of slots may be determined independently for each system. That is, the number of slots for LTE may be determined regardless of the second congestion level.

The number of slots for the LTE may be determined according to where the first congestion level is included in a preconfigured second section set, and the location of the slot may start from slot #1. In addition, the number of slots for the ITS may be determined according to where the second congestion level is included in a preconfigured third section set, and the location of the slot may start from slot #10.

Here, the second section may correspond to a first column of Table 8, and the third section may correspond to a third column.

TABLE 8

| HighRx-PowerRatio$_{LTE}$ | Number of time slots granted to LTE-V2X | HighRx-PowerRatio$_{ITSG5}$ | Number of time slots granted to ITS-G5 |
|---|---|---|---|
| <15% | 1 | <15% | 1 |
| [15-25[% | 2 | [15-25[% | 2 |
| [25-35[% | 3 | [25-35[% | 3 |
| [35-45[% | 4 | [35-45[% | 4 |
| [45-55[% | 5 | [45-55[% | 5 |
| [55-65[% | 6 | [55-65[% | 6 |
| [65-75[% | 7 | [65-75[% | 7 |
| [75-85]% | 8 | [75-85]% | 8 |
| >85% | 9 | >85% | 9 |

Figure 12:
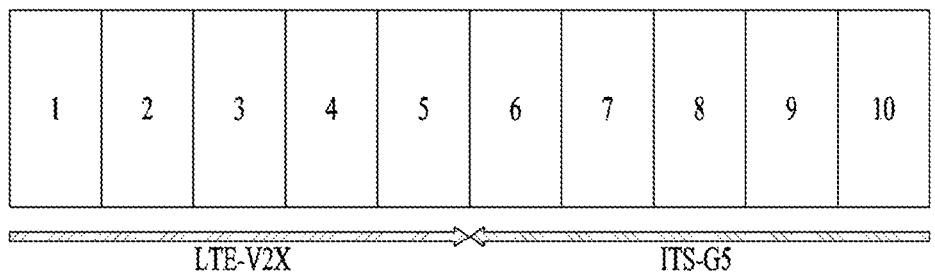

The LTE-V2X and the ITS-G5 may calculate the number of timeslots according to a HighRxPowerRatio value measured in each system. As shown in FIG. 12, when a given frequency channel is divided into 10 timeslots, the LTE-V2X may start from timeslot #1 and the ITS-G5 may start from timeslot #10, and a slot boundary may be dynamically changed. As such, when the number of slots to be used by each system is determined according to the above description, a set of slots to be used by each system may be automatically determined, preventing different UEs belonging to the same system from operating in different slots and minimizing a measurement difference between slot sets operating even when an error occurs in a measurement between UEs.

The above operation may have an effect of providing some slots using a technology to be introduced later.

Based on the above description, a user equipment (UE) may include: at least one processor; and at least one computer memory operatively connected to the at least one processor and configured to store instructions for causing the at least one processor to perform operations when executed, and in this case, the operation may include calculating first congestion level information related to an LTE UE in a predetermined section; calculating second congestion level information related to an ITS UE in the predetermined section; determining a slot for LTE based on the first congestion level information and the second congestion level information; and transmitting a sidelink signal in the slot for the LTE, and the first congestion level information may be a ratio of the number of PSCCH candidate locations having an RSRP equal to or greater than a first threshold to a total number of subchannels in the predetermined section.

In a processor for performing operations for a user equipment (UE), the operations may include calculating first congestion level information related to the LTE UE in a predetermined section; calculating second congestion level information related to the ITS UE in the predetermined section; determining a slot for LTE based on the first congestion level information and the second congestion level information, and transmitting a sidelink signal in the slot for the LTE, and in this case, the first congestion level information may be a ratio of the number of PSCCH candidate locations having an RSRP equal to or greater than a first threshold to a total number of subchannels in the predetermined section.

In a non-volatile computer-readable storage medium for storing at least one computer program including an instruction for causing at least one processor to perform operations for a user equipment (UE) when being executed by the at least one processor, the operations may include calculating first congestion level information related to an LTE UE in a predetermined section; calculating second congestion level information related to an ITS UE in the predetermined section; determining a slot for LTE based on the first congestion level information and the second congestion level information; and transmitting a sidelink signal in the slot for the LTE, and the first congestion level information may be a ratio of the number of PSCCH candidate locations having an RSRP equal to or greater than a first threshold to a total number of subchannels in the predetermined section.

Hereinafter, it may be possible to measure and compare a "ratio" equal to or greater than predetermined amount of power, or measure and compare the "number" equal to or greater than predetermined amount of power. Hereinafter, a method of measuring the "number" equal to or greater than a predetermined amount of power and performing slot allocation and arrangement between systems based on the comparison result of the number between systems will be described.

The LTE-V2X UE may calculate NumHighRxPower$_{LTE}$ by calculating a ratio of the number of PSCCH candidate locations having power in which electric power of a reference signal (RSRP) of a PSCCH is equal to or greater than a threshold among all PSCCH candidate locations transmitted in the entire subchannel*subframe, an example of which is shown in Equation 5 below.

$$\text{NumHighRxPower}_{LTE} = N_{PSCCH_{RSRP \geq Threshold}} \quad \text{[Equation 5]}$$

In this method, regardless of whether PSCCH decoding is successful or not, if there is a UE using the corresponding candidate location, information about a congestion level may be obtained based on an increase in an RSRP of the PSCCH, thereby solving the aforementioned problem of the existing operation.

The ITS-G5 UE may use the number of preambles having power equal to or greater than a predetermined level. That is, the ITS-G5 UE may calculate NumHighRxPower$_{ITSG5}$ of Equation 6 below by calculating the number of preambles having power measured to be equal to or greater than a threshold in a PPDU frame transmitted in a slot boundary.

$$\text{NumHighRxPower}_{ITSG5} = N_{Preamble_{SignalStrength \geq Threshold}} \quad \text{[Equation 6]}$$

Based on NumHighRxPower$_{LTE}$ and NumHighRxPower$_{ITSG5}$ values calculated in each system, the number and location of slots to be used by each system may be determined based on the measured values of the two systems.

Method of Determining the Number and Location of Slots According to a Relative Comparison of a NumHighRxPower Value Measured in Each System According to a relative comparison of NumHighRxPower value calculated in each system, a slot boundary of a given frequency channel may be dynamically changed.

In Table 9 below, Tech$_{percentage}$ may be determined based on $$\frac{NumHighRxPower_{LTE}}{NumHighRxPower_{LTE} + NumHighRxPower_{ITSG5}}.$$

TABLE 9

| | Tech$_{percentage}$ | Number of timeslots granted to LTE-V2X | Number of timeslots granted to ITS-G5 |
|---|---|---|---|
| state 0 (implicit) | 0% exactly (no LTE-V2Xusers) | 0 | 10 |
| state 1 | <15% | 1 | 9 |
| state 2 | [15-25[% | 2 | 8 |
| state 3 | [25-35[% | 3 | 7 |
| state 4 | [35-45[% | 4 | 6 |
| state 5 | [45-55[% | 5 | 5 |
| state 6 | [55-65[% | 6 | 4 |
| state 7 | [65-75[% | 7 | 3 |
| state 8 | [75-85]% | 8 | 2 |
| state 9 | >85% | 9 | 1 |

Figure 13:
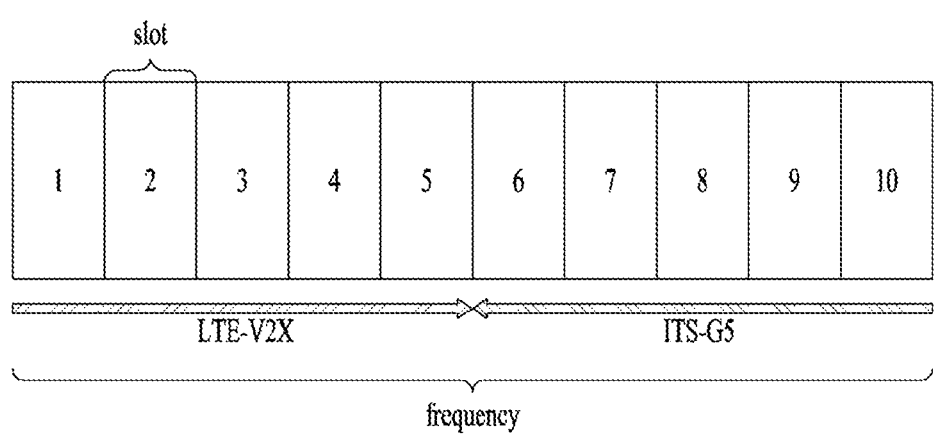

As such, when the number of slots to be used by each system is determined according to the above description, a set of slots to be used by each system may be automatically determined, preventing different UEs belonging to the same system from operating in different slots and minimizing a measurement difference between slot sets operating even when an error occurs in a measurement between UEs. The LTE-V2X and the ITS-G5 may calculate the number of timeslots according to a relative comparison of NumHighRxPower values measured in each system. As shown in FIG. 13, when a given frequency channel is divided into 10 timeslots, the LTE-V2X may start from timeslot #1 and the ITS-G5 may start from timeslot #10, and a slot boundary may be dynamically changed. Alternatively, when a frequency channel is divided into 10 timeslots, which system is preferentially allocated may be predetermined or preconfigured by a BS among the systems. As such, when the number of slots to be used by each system is determined according to the above description, a set of slots to be used by each system is automatically determined, preventing different UEs belonging to the same system from operating in different slots and minimizing a measurement difference between slot sets operating even when an error occurs in a measurement between UEs.

Figure 14:
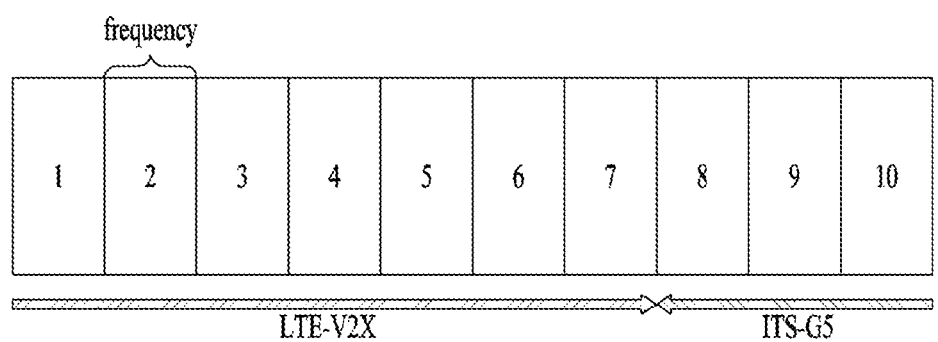

The proposed method may be applied not only to a case in which one channel is divided into several slots, but also to a case in which several channels are divided (3 Spectrum Sharing). In other words, as described above, according to a relative comparison of the HighRxPowerRatio value measured in each system or the NumHighRxPower value measured in each system, allocation of frequency resources (or subchannels) between the LTE system and the ITS-G5 system may be performed. FIG. 14 shows an example in which the LTE-V2X and ITS-G5 systems divide and use frequency resources.

Hereinafter, a method for measuring Number of ITS stations with High RX power will be described.

The LTE-V2X UE may calculate the number NumHighRxPower$_{LTE}$ of which the power power of a reference signal (RSRP) of the PSCCH received during a given interval ($T_i$)) is equal to or greater than a threshold. Alternatively, the LTE-V2X UE may calculate the number of PSCCHs (NumHighRxPower$_{LTE}$) in which power (or received power) of a reference signal (RSRP) is greater than or equal to the threshold among a plurality of PSCCHs received during a given interval ($T_i$). For example, NumHighRxPower$_{LTE}$ may be defined by Equation 7 below.

$$\text{NumHighRxPower}_{LTE} = N_{PSCCH_{RSRP \geq Threshold}} \quad \text{[Equation 7]}$$

The ITS-G5 UE may use the number of preambles having power equal to or greater than a predetermined level. That is, the ITS-G5 UE may calculate NumHighRxPower$_{ITSG5}$ by calculating the number of preambles having power measured to be equal to or greater than a threshold in a PPDU frame transmitted during a given interval ($T_i$). Alternatively, the ITS-G5 UE may calculate the number of PPDU frames (NumHighRxPower$_{ITSG5}$) including preambles having received power equal to or greater than a threshold among a plurality of PPDU frames received during a given interval ($T_i$) (Equation 8).

$$\text{NumHighRxPower}_{ITSG5} = N_{Preamble_{SignalStrength \geq Threshold}} \quad \text{[Equation 8]}$$

In each technology, in consideration of congestion control, speed, angle, etc. during a given interval ($T_i$), the LTE-V2X UE or the ITS-G5 UE may determine that nearby ITS stations transmit a signal at the same frequency as a frequency transmitted by the LTE-V2X UE or the ITS-G5 UE. The interval ($T_i$) may be transferred from a base station (or a network) or another device through a physical layer signal or a higher layer signal or may be preconfigured.

The LTE-V2X UE or the ITS-G5 UE may divide the NumHighRxPower$_{LTE}$ and NumHighRxPower$_{ITSG5}$ values into periods Freq$_{LTE}$ and Freq$_{ITSG5}$ (periods configured to transmit a signal by the LTE-V2X UE or the ITS-G5 UE according to the standard in a situation such as channel congestion or vehicle movement speed that the UE currently observes) at which the UE transmits a signal during a given interval ($T_i$) and may measure the number of ITS stations that actually use each technology. For example, this may be defined by Equation 9 below.

$$NumOfTSS_{LTE} = \frac{NumHighRxPower_{LTE}}{Freq_{LTE}} \quad \text{[Equation 9]}$$

$$NumOfTSS_{ITSG5} = \frac{NumHighRxPower_{ITSG5}}{Freq_{ITSG5}}$$

According to the above method, Tech$_{percentage}$ may be measured using $$\frac{NumOfTSS_{LTE}}{NumOfTSS_{LTE} + NumOfTSS_{ITSG5}}.$$

In this case, the LTE-V2X UE or the ITS-G5 UE may perform allocation of resources (frequency resources and/or time resources) for each of the LTE system and the ITS-G5 system based on the measured or calculated Tech$_{percentage}$ using at least one of Tables 6 to 8 above.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
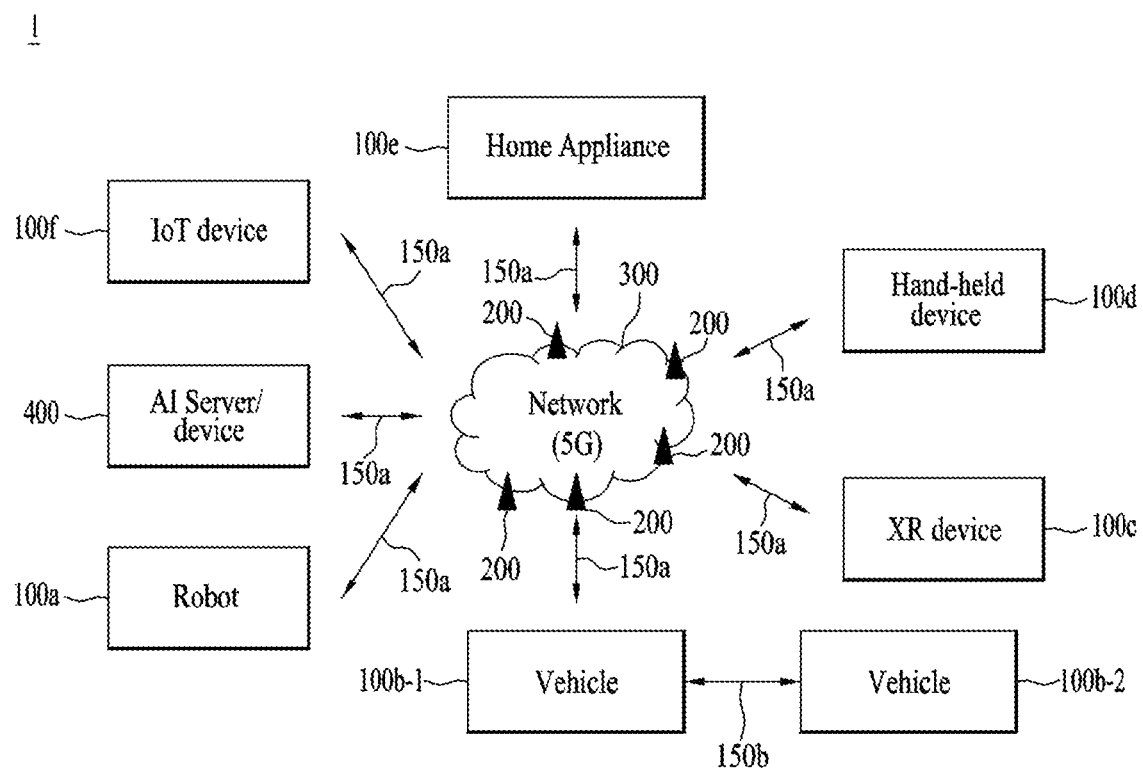
FIGS. 15 to 21 are diagrams for explaining various devices to which embodiment(s) are applicable.

FIG. 15 illustrates a communication system 1 applied to the present disclosure.

Referring to FIG. 15, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/ the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 16:
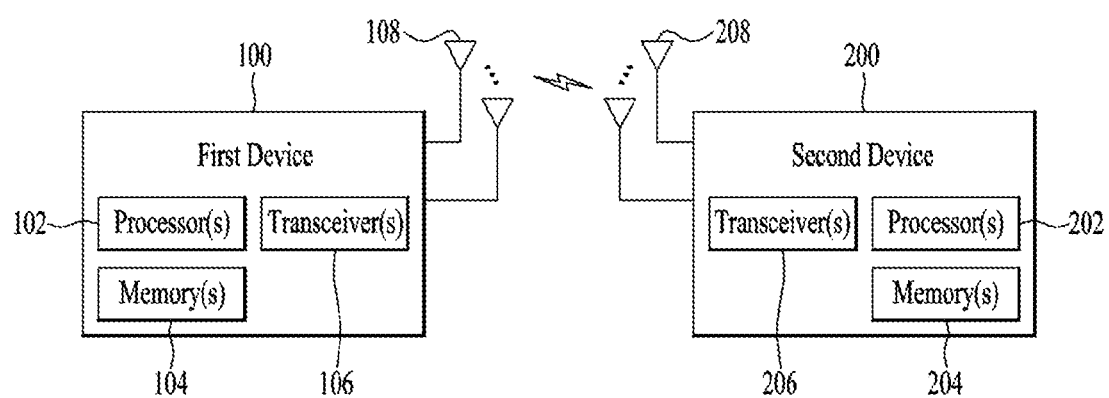

FIG. 16 illustrates wireless devices applicable to the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
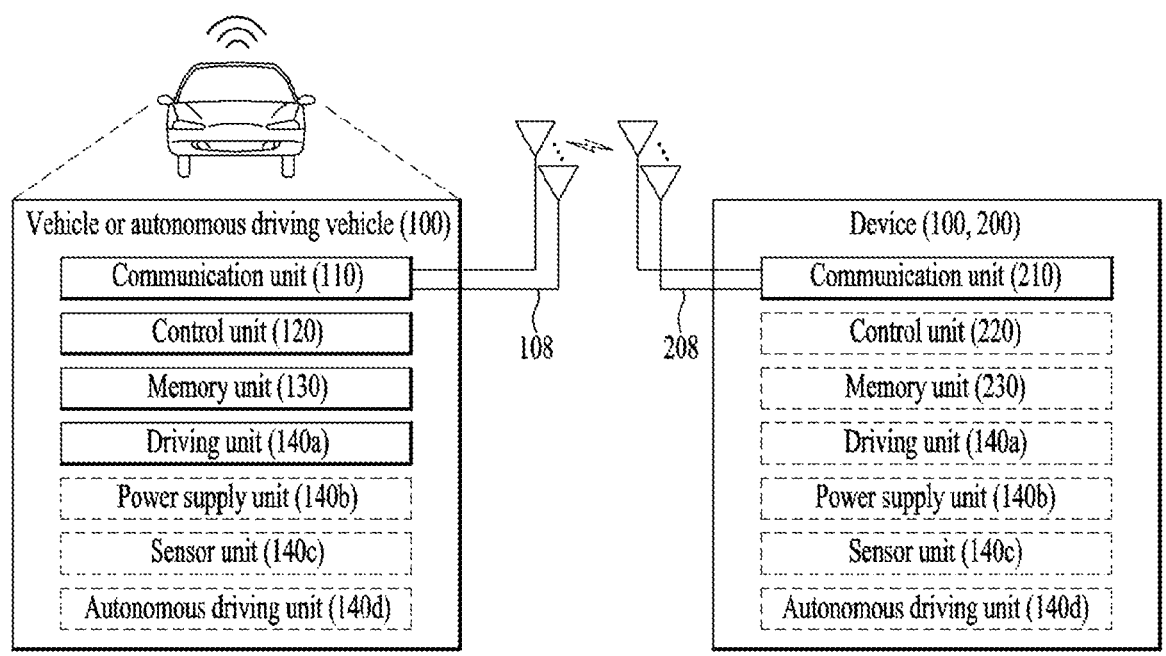

Examples of a Vehicle or an Autonomous Driving Vehicle Applicable to the Present Disclosure FIG. 17 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 43, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 18:
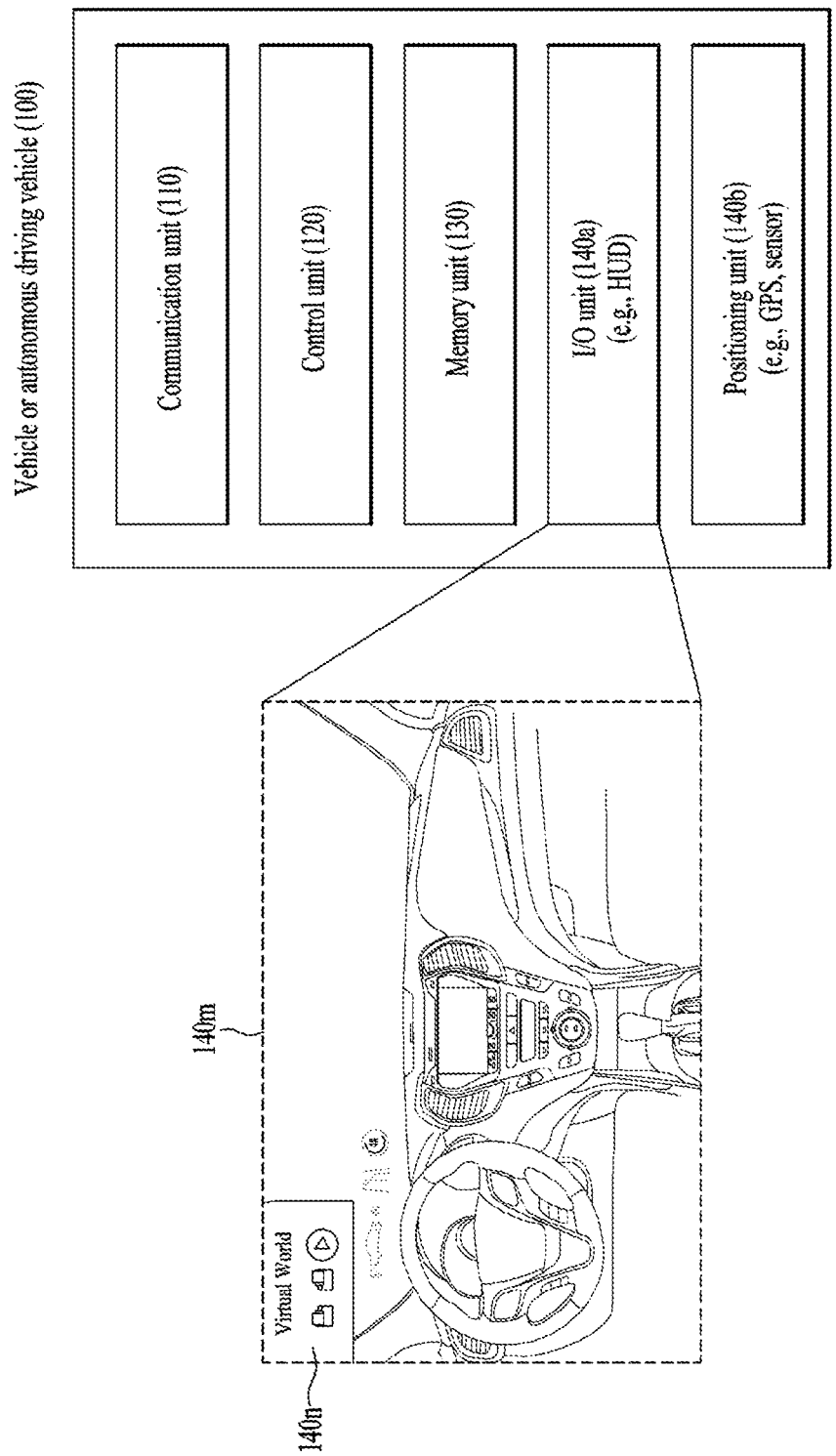

FIG. 18 illustrates a vehicle applied to the present disclosure. The vehicle may be implemented as a transport means, an aerial vehicle, a ship, etc.

Referring to FIG. 18, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 43.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 19:
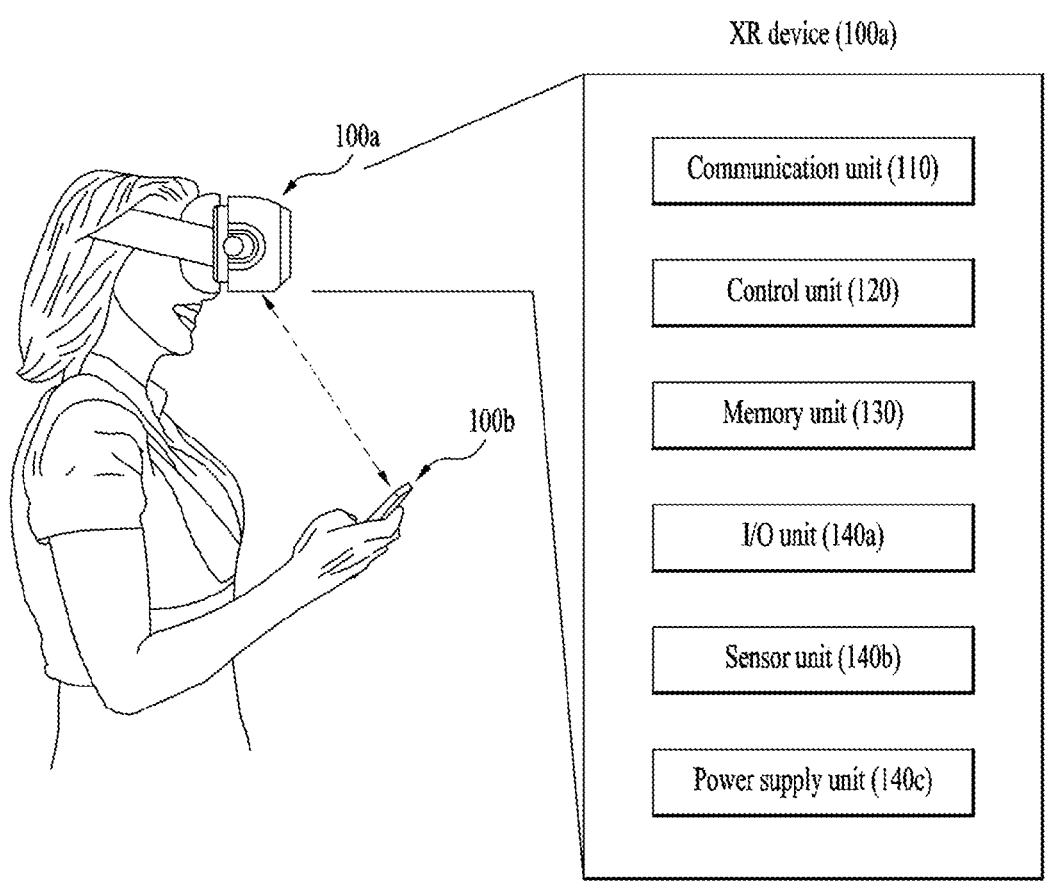

FIG. 19 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 19, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 43, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Examples of a Robot Applicable to the Present Disclosure

Figure 20:
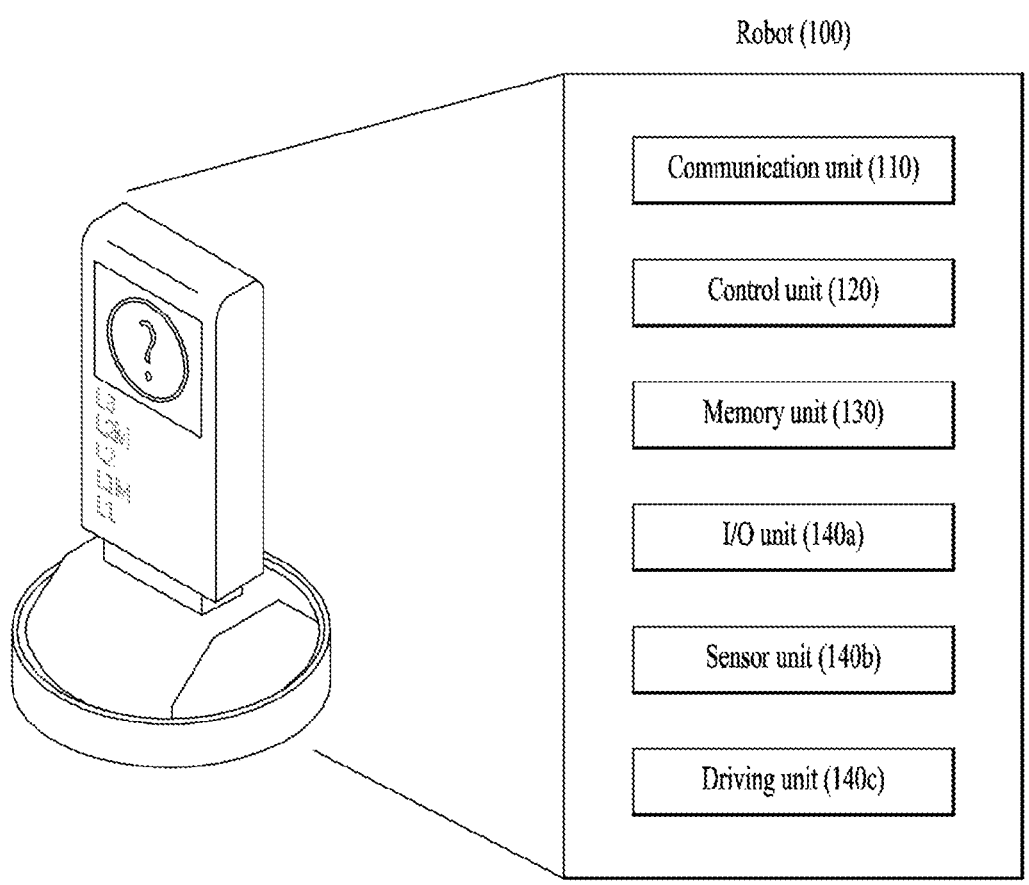

FIG. 20 illustrates a robot applied to the present disclosure. The robot may be categorized into an industrial robot, a medical robot, a household robot, a military robot, etc., according to a used purpose or field.

Referring to FIG. 20, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 16, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Example of AI Device to which the Present Disclosure is Applied.

Figure 21:
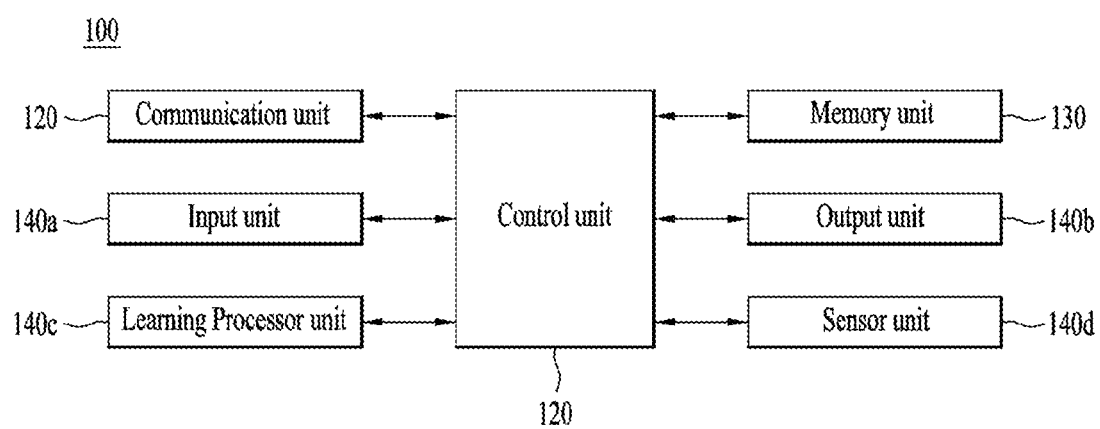

FIG. 21 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 21, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 16, respectively.

The communication unit 110 may transmit and receive wired/radio signals (e.g., sensor information, user input, learning models, or control signals) to and from external devices such as other AI devices (e.g., 100*x*, 200, or 400 of FIG. 15) or an AI server (e.g., 400 of FIG. 15) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140*c* or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 15). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 15). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

The above-described embodiments of the present disclosure are applicable to various mobile communication systems.

What is claimed is:

1. An operation method of a user equipment (UE) related to a sidelink relay in a wireless communication system, the method comprising:
   calculating, by the UE, first congestion level information related to an long term evolution (LTE) UE;
   calculating, by the UE, second congestion level information related to an Intelligent transportation systems (ITS) UE; and
   determining, by the UE, a slot for LTE based on the first congestion level information and the second congestion level information,
   wherein the first congestion level information is a ratio of a number of physical sidelink control channel (PSCCH) candidate locations having an reference signal received power (RSRP) equal to or greater than a first threshold to a total number of subchannels.

2. The method of claim 1, wherein the second congestion level information is a ratio of a number of preambles having power equal to or greater than a second threshold to a total number of preambles.

3. The method of claim 1, wherein the first congestion level is determined using $$HighRxPowerRatio_{LTE} = \frac{N_{PSCCH_{RSRP \geq Threshold}}}{numSubchannel * numSubframes},$$

the numSubchannel*numSubframes being a total number of subchannels, the $N_{PSCCH_{RSRP \geq Threshold}}$ being a number of PSCCH candidate locations having an RSRP equal to or greater than a first threshold, and $HighRxPowerRatio_{LTE}$ being the first congestion level information.

4. The method of claim 3, wherein the second congestion level is determined using $$HighRxPowerRatio_{ITSG5} = \frac{N_{Preamble_{SignalStrength \geq Threshold}}}{TotalNumPreamble},$$

the TotalNumPreamble being a total number of preambles, the $N_{Preamble_{SignalStrength \geq Threshold}}$ being a number of preambles having power equal to or greater than a second threshold, and $HighRxPowerRatio_{ITSG5}$ being the second congestion level information.

5. The method of claim 4, wherein a number of the slots for the LTE is determined according to where a value $$Tech_{percentage} = \frac{HighRxPowerRatio_{LTE}}{HighRxPowerRatio_{LTR} + HighRxPowerRatio_{ITSG5}}$$

included in a preconfigured first section set.

6. The method of claim 5, wherein the number of the slots for the LTE and a number of the slots for the ITS are configured in each section of the preconfigured first section set.

7. The method of claim 5, wherein a location of a slot according to the number of the slots for the LTE and a location of a slot according to a number of the slots for the ITS are preconfigured.

8. The method of claim 4, wherein the number of the slots for the LTE is determined irrespective of the second congestion level.

9. The method of claim 4, wherein the number of the slots for the LTE is determined according to whether the first congestion level is included in a preconfigured second section set and a location of a slot start from slot #1.

10. The method of claim 4, wherein a number of the slots for the ITS is determined according to whether the second congestion level is included in a preconfigured third section set and a location of a slot start from slot #10.

11. A use equipment (UE) in a wireless communication system, comprising:
   at least one processor; and
   at least one computer memory operatively connected to the at least one processor and configured to store instructions for causing the at least one processor to perform operations when executed,
   wherein the operations include:
   calculating first congestion level information related to an long term evolution (LTE) UE;
   calculating second congestion level information related to an intelligent transportation systems (ITS) UE; and
   determining a slot for LTE based on the first congestion level information and the second congestion level information,
   wherein the first congestion level information is a ratio of a number of physical sidelink control channel (PSCCH) candidate locations having an reference signal received power (RSRP) equal to or greater than a first threshold to a total number of subchannels.

12. The method of claim 1, wherein each of the first congestion level information and the second congestion level information is calculated within a predetermined section.

* * * * *